(12) United States Patent
Wang et al.

(10) Patent No.: US 10,571,728 B2
(45) Date of Patent: Feb. 25, 2020

(54) DISPLAY DEVICE AND METHOD FOR ASSEMBLING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Na Wang, Shenzhen (CN); Cheng-Fa Chung, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/919,287

(22) Filed: Mar. 13, 2018

(65) Prior Publication Data

US 2019/0204658 A1    Jul. 4, 2019

(30) Foreign Application Priority Data

Dec. 29, 2017    (CN) .......................... 2017 1 1475952

(51) Int. Cl.
*G02F 1/1333* (2006.01)
*G02F 1/03* (2006.01)
(52) U.S. Cl.
CPC ...... *G02F 1/133308* (2013.01); *G02F 1/0311* (2013.01); *G02F 2001/13332* (2013.01); *G02F 2001/133314* (2013.01)

(58) Field of Classification Search
CPC ............ G02F 1/133308; G02F 1/0311; G02F 2001/13332; G02F 2001/133314; G02F 2001/133317; G02F 2001/133328
See application file for complete search history.

(56) References Cited

U.S. PATENT DOCUMENTS

| | | | | |
|---|---|---|---|---|
| 8,641,240 B2* | 2/2014 | Wang | ................ | G02F 1/133308 362/249.01 |
| 9,645,294 B2* | 5/2017 | Momose | ............... | G02B 6/0036 |
| 2005/0195620 A1* | 9/2005 | Hwang | ............. | G02F 1/133608 362/581 |

(Continued)

FOREIGN PATENT DOCUMENTS

TW    200844551 A    11/2008

*Primary Examiner* — Joseph L Williams
*Assistant Examiner* — Jose M Diaz
(74) *Attorney, Agent, or Firm* — ScienBiziP, P.C.

(57) ABSTRACT

A fast-disassemblable display device includes a middle frame, a connecting plate, a backboard, an optical component, a display panel, and a bottommost frame. The middle frame includes a topmost frame, a left frame, and a right frame cooperatively defining a receiving space. The middle frame defines a sliding groove at inner surfaces thereof. The connecting plate is fixedly received in the sliding groove. The backboard is received in the sliding groove, and can slide into the receiving space through the sliding groove. The optical component is connected to the connecting plate. The display panel is connected to the middle frame, and positioned at a side of the optical component facing away from the backboard. The bottommost frame is connected to end portions of the left frame and the right frame facing away from the topmost frame.

10 Claims, 5 Drawing Sheets

(56) References Cited

U.S. PATENT DOCUMENTS

| | | | | |
|---|---|---|---|---|
| 2008/0129918 A1* | 6/2008 | Kim | ............ | G02F 1/133308 |
| | | | | 349/58 |
| 2008/0278656 A1* | 11/2008 | Yuan | ............ | G02F 1/133608 |
| | | | | 349/58 |
| 2009/0207560 A1* | 8/2009 | Lee | ............ | H01L 51/5237 |
| | | | | 361/679.01 |
| 2010/0182529 A1* | 7/2010 | Nakanishi | ............ | G02F 1/1336 |
| | | | | 349/58 |
| 2012/0212966 A1* | 8/2012 | Wang | ............ | G02F 1/133308 |
| | | | | 362/362 |
| 2013/0050820 A1* | 2/2013 | Shin | ............ | G06F 1/1601 |
| | | | | 359/465 |
| 2015/0062480 A1* | 3/2015 | Cho | ............ | G02F 1/133308 |
| | | | | 349/58 |
| 2017/0123259 A1* | 5/2017 | Kim | ............ | G02F 1/133308 |
| 2018/0321542 A1* | 11/2018 | Onishi | ............ | G02F 1/133512 |

\* cited by examiner

DISPLAY DEVICE AND METHOD FOR ASSEMBLING THE SAME

FIELD

The subject matter relates to a display device and a method for assembling the display device.

BACKGROUND

A borderless television is assembled by steps of connecting a glass panel to a middle frame to obtain a glass panel assembly, connecting a light source and a heat-dissipation component to a backboard to obtain a backboard assembly, and connecting an optical component (including a light guide plate) to the backboard assembly. The glass panel assembly is then connected to the backboard assembly.

The light source, the heat-dissipation component, the optical component, and the glass panel are assembled to the backboard assembly, but if the backboard needs to be changed or customized, disassembly of the television must be by reversing the above assembly steps. Thus, the disassembly of the television is troublesome. Improvements in the art are preferred.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIGS. 1 to 4 illustrate an exemplary embodiment of a display device 100. The display device 100 comprises a middle frame 10, a backboard 20, at least one heat-dissipation component 30, an optical component 40, a display panel 50, and a bottom frame 60. In at least one exemplary embodiment, the display device 100 is a thin-profile television.

The middle frame 10 is substantially U-shaped and comprises a top frame 11, a left frame 12, and a right frame 13. The left frame 12 and the right frame 13 are connected to two ends of the top frame 11, and protrude from the top frame 11 along a same direction. The left frame 12 and the right frame 13 are substantially parallel to each other, and substantially perpendicular to the top frame 11. The top frame 11, the left frame 12, and the right frame 13 cooperatively define a receiving space 200 for receiving the backboard 20.

The middle frame 10 defines a sliding groove 14 at inner surfaces thereof. The sliding groove 14 communicates with the receiving space 200. The backboard 20 is slidably received in the sliding groove 14, and can slide into the receiving space 200 through the sliding groove 14. The sliding groove 14 comprises a left groove portion 141 positioned at an inner surface of the left frame 12 (that is, a surface of the left frame 12 facing the right frame 13), and a right groove portion 143 positioned at an inner surface of the right frame 13 (that is, a surface of the right frame 13 facing the left frame 12).

In at least one exemplary embodiment, the middle frame 10 comprises a side baffle 101 being substantially U-shaped, and a front baffle 102 and a back baffle 103 perpendicularly extending from an inner surface of the side baffle 101. The front baffle 102 and the back baffle 103 are spaced apart from each other, thereby cooperatively defining the sliding groove 14. That is, a portion of the side baffle 101 corresponding to the left frame 12 forms a bottom of the left groove portion 141. A portion of the front baffle 102 and a portion of the back baffle 103 corresponding to the left frame 12 form two sidewalls of the left groove portion 141. A portion of the side baffle 101 corresponding to the right frame 13 forms a bottom of the right groove portion 143. A portion of the front baffle 102 and a portion of the back baffle 103 corresponding to the right frame 13 form two sidewalls of the right groove portion 143.

The backboard 20 is substantially rectangular, and comprises a front surface 21, a back surface 22, a top wall 23, a right wall 24, a bottom wall 25, and a left wall 26. The back surface 22 faces away from the front surface 21. The top wall 23, the right wall 24, the bottom wall 25, and the left wall 26 connect to each other in that order, and surround the four edges of the front surface 21 and the back surface 22. The top wall 23 and the bottom wall 25 face and are perpendicular to each other. The left wall 26 and the right wall 24 face and are perpendicular to each other.

A left cutout 260 is defined in the left wall 26 towards a geometrical center of the backboard 20. The left cutout 260 connects the back surface 22, and comprises a sliding surface 261. The sliding surface 261 of the left cutout 260 is positioned between and parallel to the front surface 21 and the back surface 22. A right cutout 240 is defined in the right wall 24 towards the geometrical center of the backboard 20. The right cutout 240 connects the back surface 22, and comprises a sliding surface 241. The sliding surface 241 of the right cutout 240 is positioned between and parallel to the front surface 21 and the back surface 22. The backboard 20 slides in the sliding groove 14 through the sliding surface 261 of the left cutout 260 and the sliding surface 241 of the right cutout 240.

A top cutout 230 (shown in FIG. 4) is defined in the top wall 23 towards the geometrical center of the backboard 20. The top cutout 230 comprises a stopping surface 231. The stopping surface 231 is perpendicularly connects to the back surface 22. The left cutout 260, the top cutout 230, and the right cutout 240 communicate with each other. When the backboard 20 is received in the receiving space 200, the stopping surface 231 abuts against an edge of the back baffle 103 corresponding to the top frame 11.

In at least one exemplary embodiment, one of the two sidewalls of the left groove portion 141 comprises a guiding bar 144 along an extending direction of the left groove portion 141. One of the two sidewalls of the right groove portion 143 also comprises a guiding bar 144 along an extending direction of the right groove portion 143. The sliding surface 261 of the left wall 26 defines a guiding slot 27. The sliding surface 241 of the right wall 24 also defines a guiding slot 27. When the backboard 20 slides in the sliding groove 14, the guiding slots 27 engage with the guiding bars 144, thereby allowing the backboard 20 to slide into the receiving space 200 along the guiding bars 144.

A connecting plate 70 is received in the sliding groove 14. In at least one exemplary embodiment, the connecting plate 70 comprises a first connecting portion 71 positioned at the top frame 11, a second connecting portion 72 positioned at the left frame 12, and a third connecting portion 73 positioned at the right frame 73. Each of the first connecting portion 71, the second connecting portion 72, and the third connecting portion 73 is substantially L-shaped, that is, each of the first connecting portion 71, the second connecting portion 72, and the third connecting portion 73 comprises a mounting portion 74 connected to the side baffle 101 and a supporting portion 75 perpendicularly extending from the mounting portion 74. The supporting portion 75 is positioned within the sliding groove 14, thereby dividing the receiving space 200 into a first space 201 and a second space 202. The backboard 20 is received in the first space 201.

In at least one exemplary embodiment, the connecting plate 70 is connected to the middle frame 10 through a number of first screws (not shown). In another exemplary embodiment, the connecting plate 70 is integrally formed with the middle frame 10.

The optical component 40 is connected to the supporting portion 75, and is received in the second space 202. The optical component 40 comprises a light guide plate, a light diffusion plate, at least one reflection plate, a brightness enhancing film, and a number of light sources (not shown).

The display panel 50 is connected to a side of the front baffle 102 facing away from the optical component 40 through adhesive 51. In at least one exemplary embodiment, a rib 15 extends from a side of the side baffle 101 facing away from the back baffle 103. The rib 15 and the front baffle 102 cooperatively define a receiving space 150 for receiving the display panel 50. In at least one exemplary embodiment, the display panel 50 can be a liquid crystal display panel or a plasma display panel.

The bottom frame 60 is connected to end portions of the left frame 12 and the right frame 13 facing away from the top frame 11, thereby limiting the backboard 20, the optical component 40, and the display panel 50 in the receiving space 200. The heat-dissipation component 30 is connected to the bottom frame 60 to dissipate heat generated by the display device 100. The heat-dissipation component 30 can be, but is not limited to, a fan. In at least one exemplary embodiment, the bottom frame 60 is connected to the left frame 12 and the right frame 13 through a number of second screws (not shown), and is connected to the backboard 20, the optical component 40, and the display panel 50 through a number of third screws (not shown).

Figure 5:
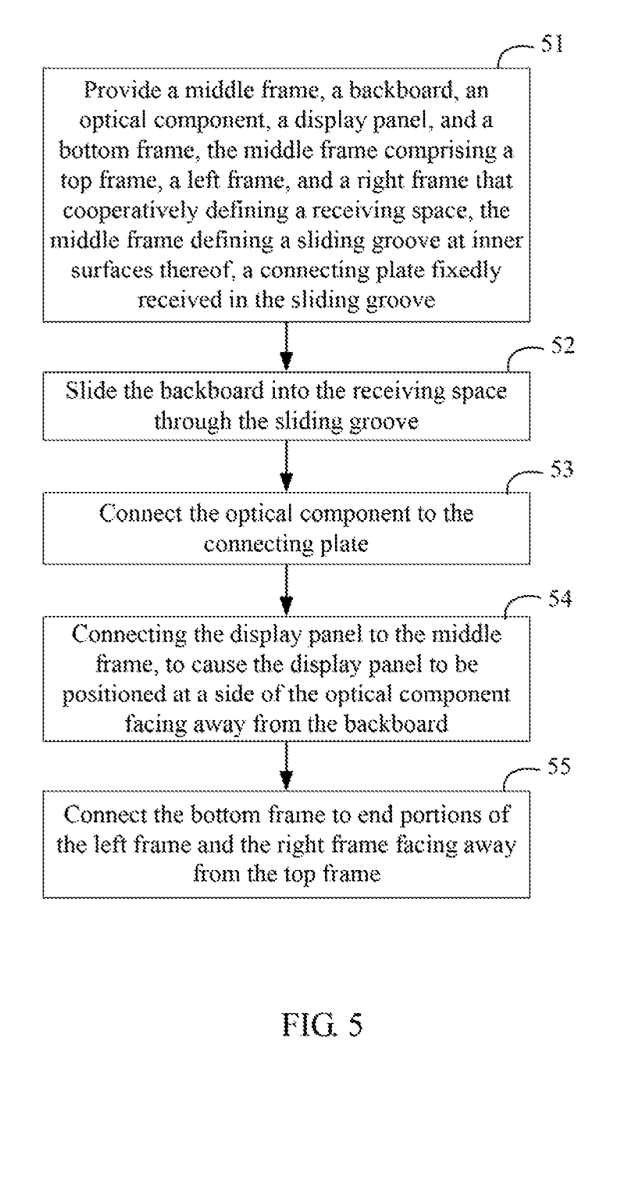
FIG. 5 is a flowchart of an exemplary embodiment of a method for assembling a display device.

FIG. 5 illustrates an exemplary embodiment of a method for assembling the display device 100. The method is provided by way of example, as there are a variety of ways to carry out the method. The method described below can be carried out by the configurations illustrated in FIGS. 1-4, for example, and various elements of these figures are referenced in explaining example method. Each block shown in FIG. 5 represents one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 51.

At block 51, the middle frame 10, the backboard 20, the heat-dissipation component 30, the optical component 40, the display panel 50, and the bottom frame 60 are provided. The middle frame 10 comprises a top frame 11, a left frame 12, and a right frame 13. The left frame 12 and the right frame 13 are connected to two ends of the top frame 11, and protrude from the top frame 11 along a same direction. The top frame 11, the left frame 12, and the right frame 13 cooperatively define a receiving space 200. The middle frame 10 defines a sliding groove 14 at inner surfaces thereof. The sliding groove 14 communicates with the receiving space 200. A connecting plate 70 is fixedly received in the sliding groove 14.

At block 52, the backboard 20 is slided into the receiving space 200 through the sliding groove 14. In at least one exemplary embodiment, when the backboard 20 is received in the receiving space 200, the stopping surface 231 abuts against an edge of the back baffle 103 corresponding to the top frame 11.

At block 53, the optical component 40 is connected to the connecting plate 70.

At block 54, the display panel 50 is connected to the middle frame 10, to cause the display panel 50 to be positioned at a side of the optical component 40 facing away from the backboard 20.

At block 55, the bottom frame 60 is connected to end portions of the left frame 12 and the right frame 13 facing away from the top frame 11. Thus, the display device 100 is obtained.

Figure 1:
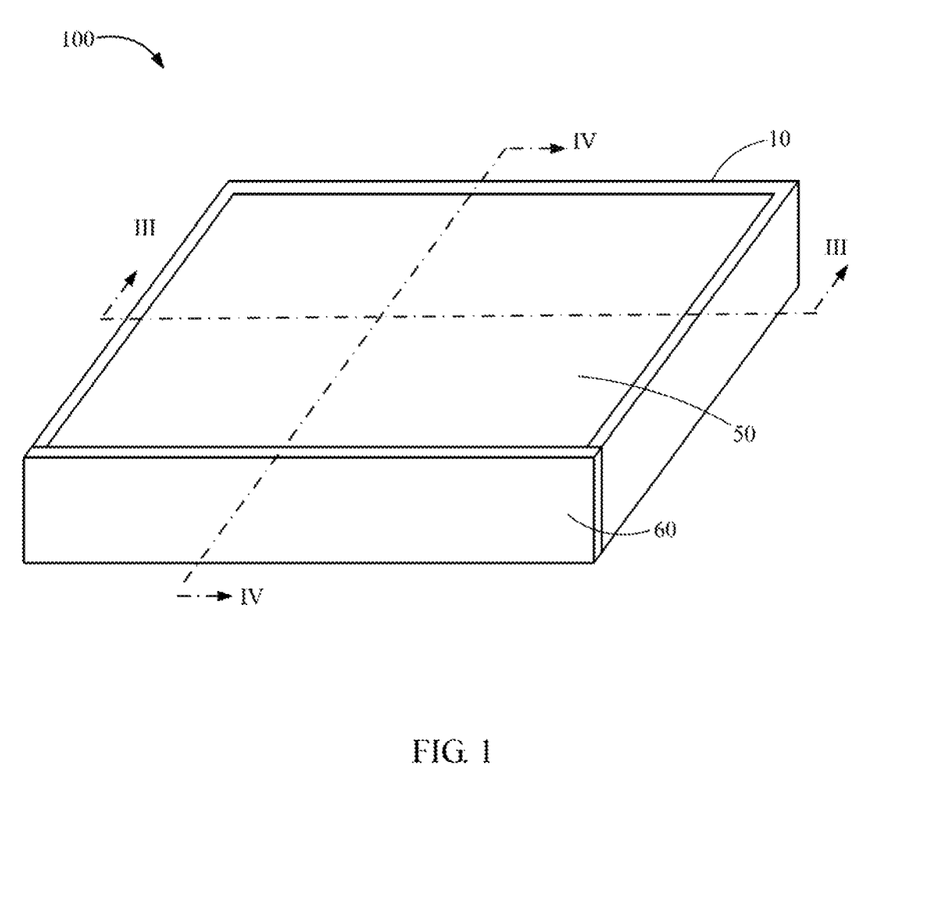
FIG. 1 is a diagram of an exemplary embodiment of a display device of the present disclosure.
Figure 2:
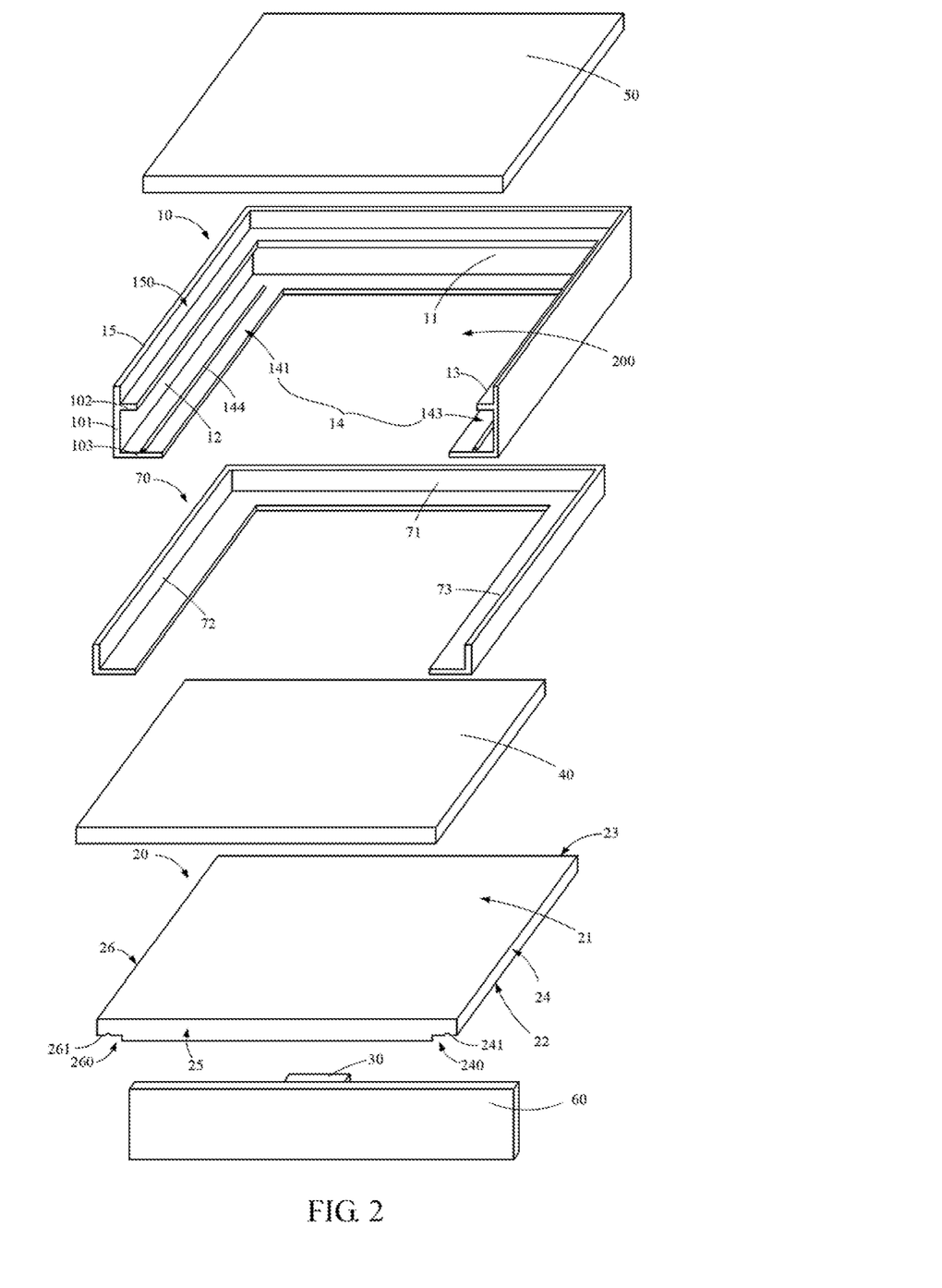
FIG. 2 is an exploded diagram of the display device of FIG. 1.
Figure 3:
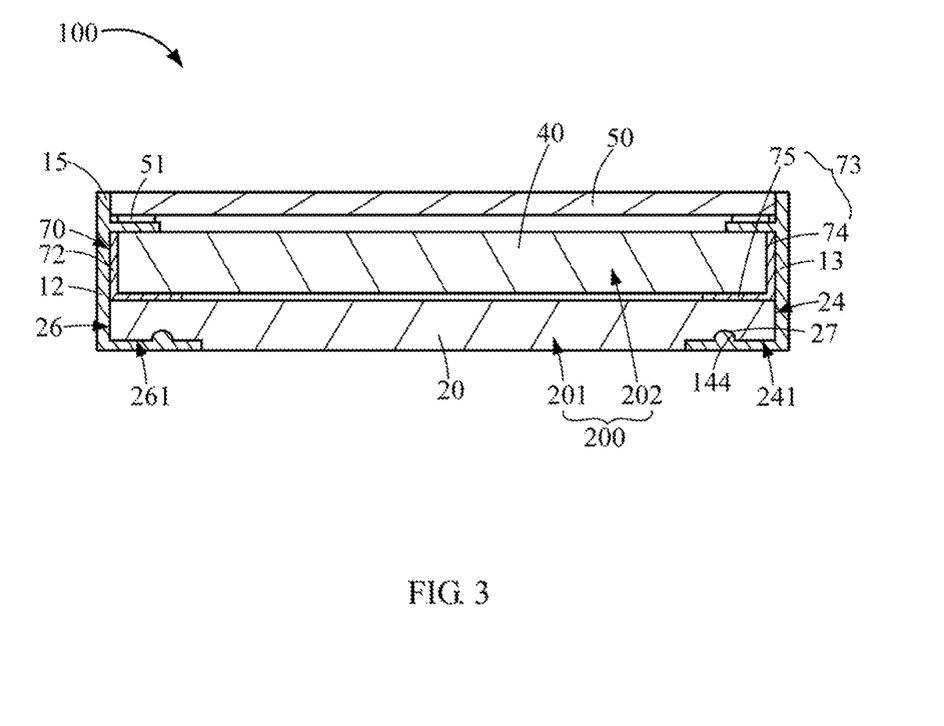
FIG. 3 is a cross-sectional view taken along line III-III of FIG. 1.
Figure 4:
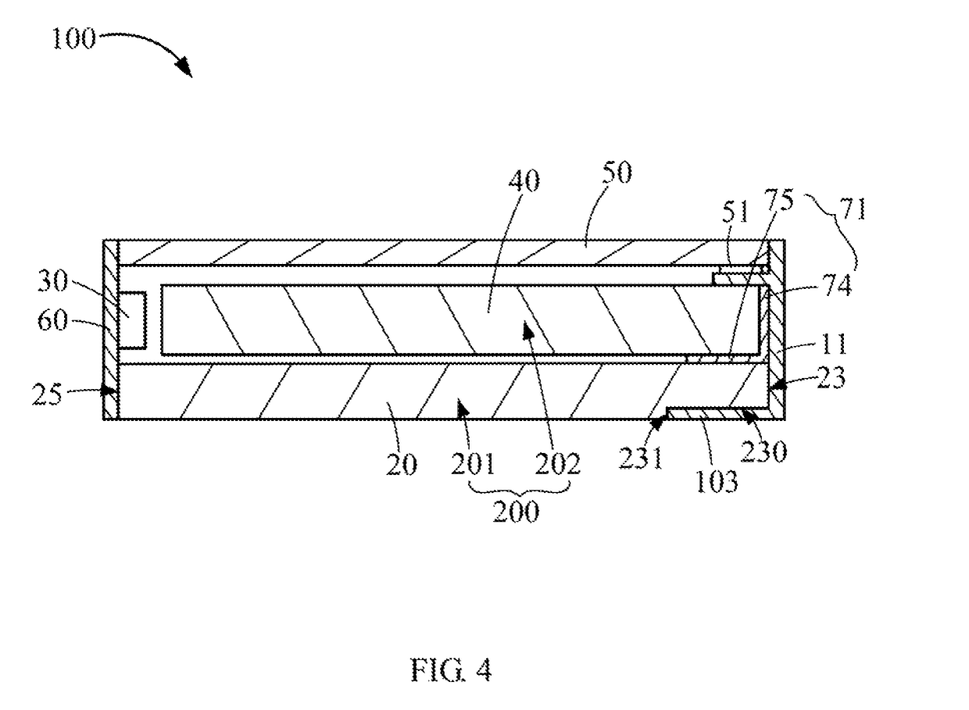
FIG. 4 is a cross-sectional view taken along line IV-IV of FIG. 1.

With the above configuration, when the display device 100 is in use, the display panel 50 faces the user, and is perpendicular to the ground (or can be inclined with respect to the ground). Thus, "front" means a side of the display device 100 adjacent to the user, "back" means a side of the display device 100 facing away from the user, "top" means a side of the display device 100 facing away from the ground, "bottom" means a side of the display device 100 adjacent to ground, "left" means the left side of the display device 100 when the display device 100 faces the user, and "right" means the right side of the display device 100 when the display device 100 faces the user.

In the display device 100, the backboard 20 is slidably received in the sliding groove 14, and can slide into the receiving space 200 along the sliding groove 14. Other components, including the heat-dissipation component 30, the optical component 40, and the display panel 50, are not directly secured to the backboard 20. Thus, the backboard 20 can be disassembled from the display device 100 by moving the backboard 20 out of the receiving space 200 through the sliding groove 14. That is, the disassembly of the backboard 20 is easily achieved.

Depending on the embodiment, certain of the steps of method hereinbefore described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. A display device comprising:
a middle frame comprising a top frame, a left frame, and a right frame, the left frame and the right frame connected to two ends of the top frame and protruding from the top frame along a same direction, the top frame, the left frame, and the right frame cooperatively defining a receiving space, the middle frame defining a sliding groove at inner surfaces thereof, the sliding groove communicating with the receiving space;
a connecting plate fixedly received in the sliding groove;
a backboard slidably received in the sliding groove, and able to slide into the receiving space through the sliding groove, wherein the backboard comprises a front surface, a back surface, a top wall, a right wall, a bottom wall, and a left wall, the back surface faces away from the front surface, the top wall, the right wall, the bottom wall, and the left wall connect to each other in that order and surround the four edges of the front surface and the back surface, a top cutout is defined in the top wall towards a geometrical center of the backboard, the top cutout comprises a stopping surface which perpendicularly connects the back surface, the stopping surface abuts against an edge of the top frame when the backboard is received in the receiving space;
an optical component connected to the connecting plate;
a display panel connected to the middle frame and positioned at a side of the optical component facing away from the backboard; and
a bottom frame connected to end portions of the left frame and the right frame facing away from the top frame, thereby limiting the backboard, the optical component, and the display panel in the receiving space.

2. The display device of claim 1, wherein the sliding groove comprises a left groove portion positioned at a surface of the left frame facing the right frame, and a right groove portion positioned at a surface of the right frame facing the left frame, the middle frame comprises a side baffle, and a front baffle and a back baffle perpendicularly extending from an inner surface of the side baffle, the front baffle and the back baffle are spaced apart from each other, thereby cooperatively defining the sliding groove, a portion of the side baffle corresponding to the left frame forms a bottom of the left groove portion, a portion of the front baffle and a portion of the back baffle corresponding to the left frame form two sidewalls of the left groove portion, a portion of the side baffle corresponding to the right frame forms a bottom of the right groove portion, a portion of the front baffle and a portion of the back baffle corresponding to the right frame form two sidewalls of the right groove portion, the stopping surface abuts against an edge of the back baffle corresponding to the top frame when the backboard is received in the receiving space.

3. The display device of claim 1, wherein a left cutout is defined in the left wall towards the geometrical center of the backboard, the left cutout connects the back surface, and comprises a sliding surface which is positioned between and parallel to the front surface and the back surface, a right cutout is defined in the right wall towards the geometrical center of the backboard, the right cutout connects the back surface, and comprises a sliding surface which is positioned between and parallel to the front surface and the back surface, the left cutout, the right cutout, and the top cutout communicate with each other, the backboard slides in the sliding groove through the sliding surface of the left cutout and the sliding surface of the right cutout.

4. The display device of claim 3, wherein one of the two sidewalls of the left groove portion comprises a guiding bar along an extending direction of the left groove portion, one of the two sidewalls of the right groove portion also comprises a guiding bar along an extending direction of the right groove portion, the sliding surface of the left wall defines a guiding slot, the sliding surface of the right wall also defines a guiding slot, when the backboard slides in the sliding groove, the guiding slots engage with the guiding bars.

5. The display device of claim 3, wherein the connecting plate comprises a first connecting portion positioned at the top frame, a second connecting portion positioned at the left frame, and a third connecting portion positioned at the right frame, each of the first connecting portion, the second connecting portion, and the third connecting portion comprises a mounting portion connected to the side baffle and a supporting portion perpendicularly extending from the mounting portion, the supporting portion is positioned within the sliding groove, thereby dividing the receiving space into a first space and a second space, the backboard is received in the first space.

6. The display device of claim 5, wherein the connecting plate is integrally formed with the middle frame.

7. The display device of claim 5, wherein the optical component is connected to the supporting portion, and is received in the second space.

8. The display device of claim 5, further comprising at least one heat-dissipation component connected to the bottom frame.

9. The display device of claim 2, wherein a rib extends from a side of the side baffle facing away from the back baffle, the rib and the front baffle cooperatively define a receiving space for receiving the display panel.

10. A method for assembling a display device, comprising:
providing a middle frame, a backboard, an optical component, a display panel, and a bottom frame, the middle frame comprising a top frame, a left frame, and a right frame, the left frame and the right frame connected to two ends of the top frame and protruding from the top frame along a same direction, the top frame, the left frame, and the right frame cooperatively defining a receiving space, the middle frame defining a sliding groove at inner surfaces thereof, the sliding groove communicating with the receiving space, a connecting plate fixedly received in the sliding groove, wherein the backboard comprises a front surface, a back surface, a top wall, a right wall, a bottom wall, and a left wall, the back surface faces away from the front surface, the top wall, the right wall, the bottom wall, and the left wall connect to each other in that order and surround the four edges of the front surface and the back surface, a top cutout is defined in the top wall towards a geometrical center of the backboard, the top cutout comprises a stopping surface which perpendicularly connects the back surface;

sliding the backboard into the receiving space through the sliding groove until the stopping surface abuts against an edge of the top frame;

connecting the optical component to the connecting plate;

connecting the display panel to the middle frame, to cause the display panel to be positioned at a side of the optical component facing away from the backboard; and connecting the bottom frame to end portions of the left frame and the right frame facing away from the top frame, thereby limiting the backboard, the optical component, and the display panel in the receiving space.

* * * * *